May 21, 1968 F. A. KROHM 3,383,731
WINDSHIELD WIPER ARM AND BLADE ASSEMBLY
Filed Jan. 23, 1956 3 Sheets-Sheet 1
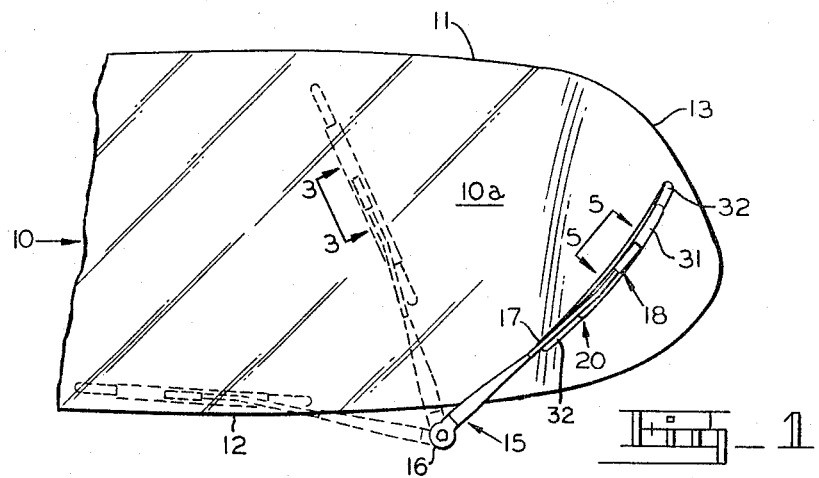
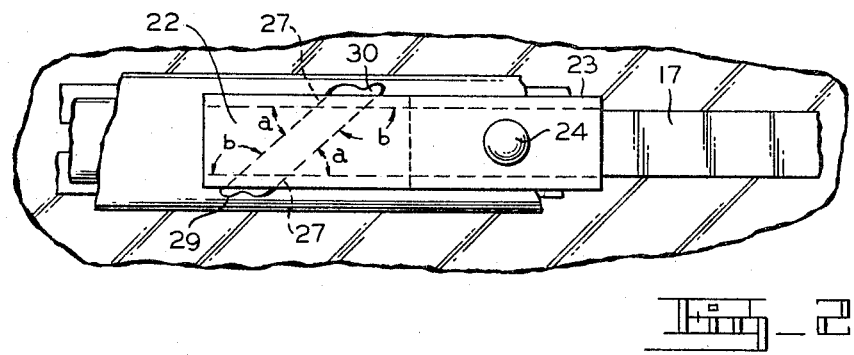
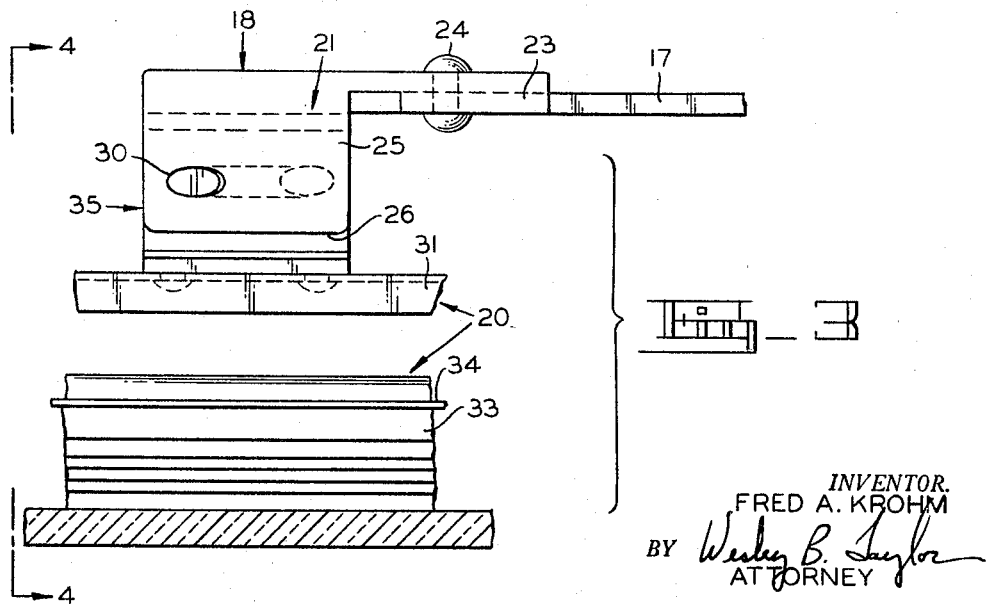
INVENTOR.
FRED A. KROHM
BY
ATTORNEY May 21, 1968  F. A. KROHM  3,383,731
WINDSHIELD WIPER ARM AND BLADE ASSEMBLY
Filed Jan. 23, 1956  3 Sheets-Sheet 2
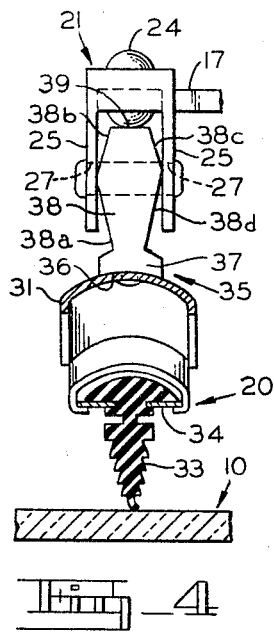
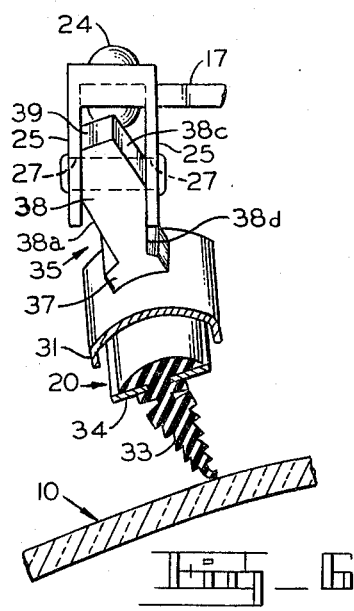
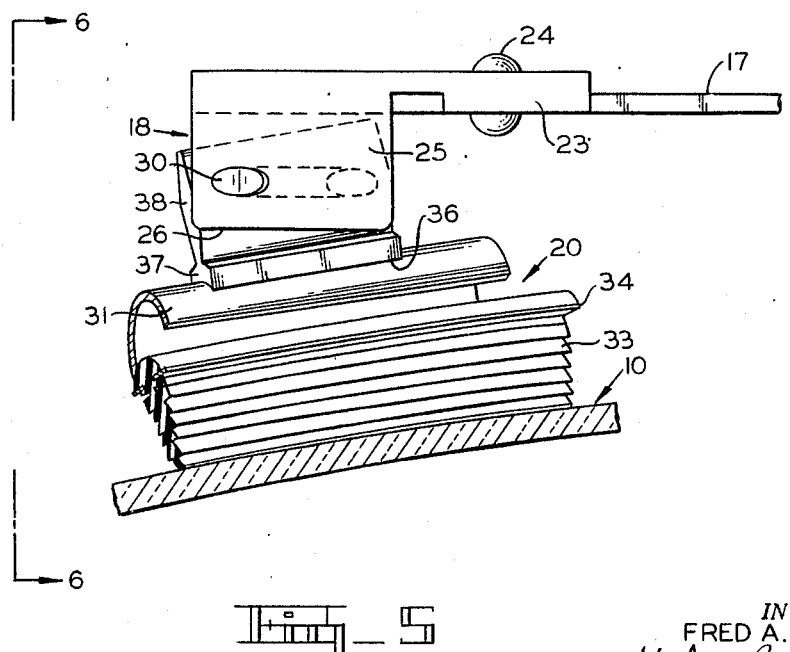
INVENTOR.
FRED A. KROHM
BY
ATTORNEY May 21, 1968  F. A. KROHM  3,383,731
WINDSHIELD WIPER ARM AND BLADE ASSEMBLY
Filed Jan. 23, 1956  3 Sheets-Sheet 3
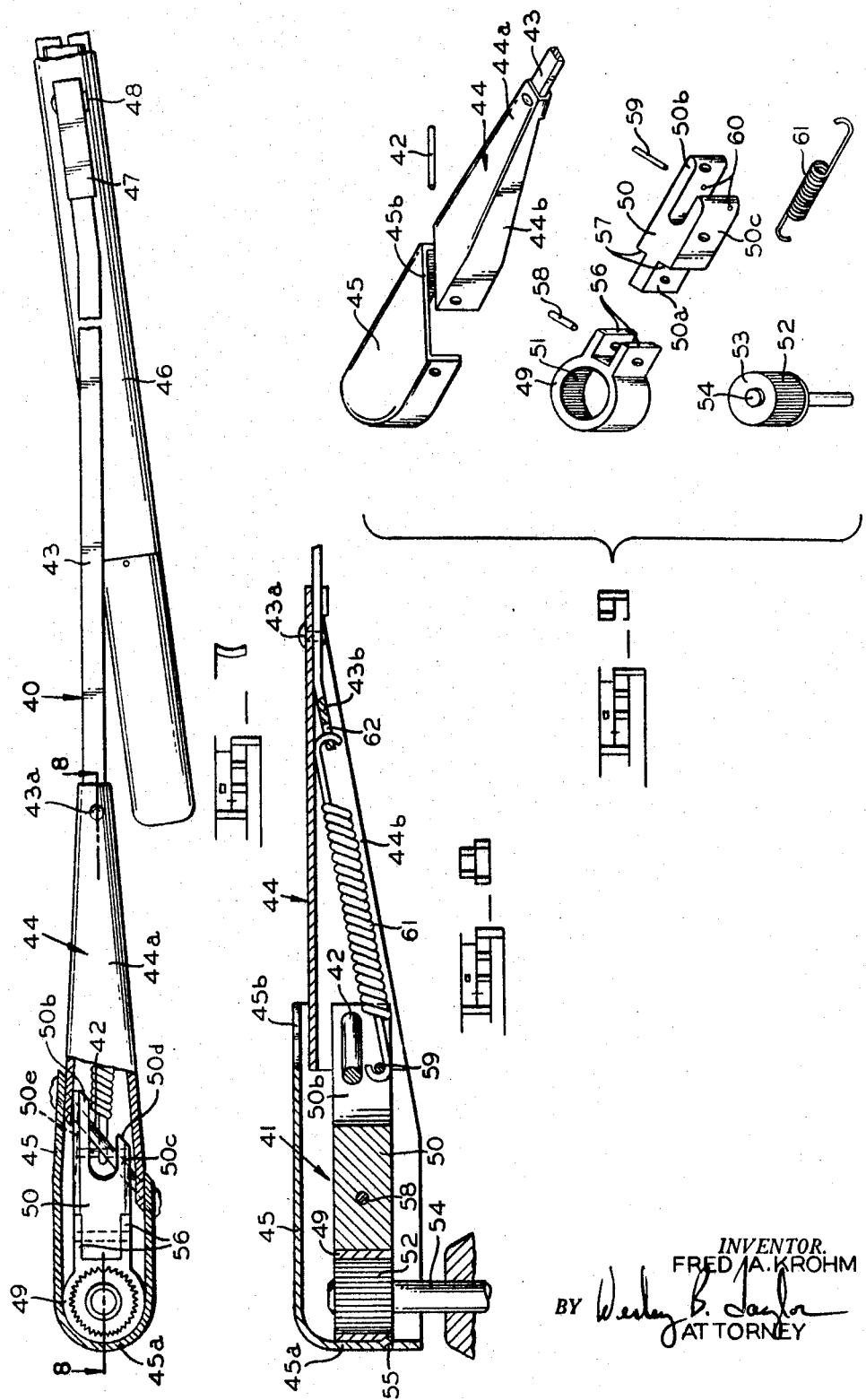
INVENTOR.
FRED A. KROHM
BY Wesley B. Taylor
ATTORNEY

United States Patent Office 3,383,731
Patented May 21, 1968

3,383,731
WINDSHIELD WIPER ARM AND
BLADE ASSEMBLY
Fred A. Krohm, Hobart, Ind., assignor to The Anderson
Company, a corporation of Indiana
Continuation-in-part of application Ser. No. 540,040,
Oct. 12, 1955. This application Jan. 23, 1956, Ser.
No. 560,688
2 Claims. (Cl. 15—250.23)

The present invention relates to a wiper arm and blade assembly for the wiping of a vehicular windshield or the like and to a method of wiping a windshield. More particularly, this invention pertains to a method of wiping windshield surfaces of varying curvature and to a windshield wiper assembly provided with means for maintaining the wiper blade sufficiently erect to such a windshield surface to insure effective wiping performance.

The present application is a continuation-in-part of my application entitled, Windshield Wiper Arm and Blade Assembly, filed Oct. 12, 1955, and assigned Ser. No. 540,040. As such the present application is an improvement upon the structure and method disclosed in the pending application of John W. Anderson, Ser. No. 532,640, filed Sept. 6, 1955.

In the earlier filed Anderson application, there are described the difficulties which are involved in the wiping of windshields of appreciably varying curvature and variant vertical inclination, commonly referred to as "wrap-around" windshield. As there explained, it is necessary to maintain the blade wiping element or squeegee in correct attitude to the windshield surface, so that the wiping edge of the blade lies at the proper squeegee angle for optimum wiping.

The present invention now proposes the utilization of angularly disposed pivot means intermediate the ends of a windshield wiper assembly to provide windshield conforming movements of the assembly relative to the windshield. In one form, the angularly disposed pivot means may be between a windshield wiper arm and wiping element or blade and thus accommodate blade movement relative to the arm about a single pivot connection or axis disposed at an acute angle to the longitudinal axes of the arm and the blade. In order to conform the longitudinally extending blade wiping edge to the windshield surface, movement of the blade relative to the arm is necessary in this form of the present invention as the arm and blade traverse the varyingly curved windshield. Since all of the relative movement between the arm and the blade is necessarily confined to the single axis, the conforming movement of the blade relative to the arm will cause tilting movement of the blade with respect to the arm.

The degree of tilt required is that which is necessary to maintain the blade in substantially erect position with respect to the windshield glass, and this degree of tilt depends, first, upon the amount of conforming movement necessary to retain the longitudinal wiping edge of the blade in contact with the glass and, secondly, upon the angularity of the pivot axis with respect to the longitudinal axis of the arm and the blade.

However, the angularly disposed pivot means or connection need not be placed between the arm and blade or wiping element. Instead, the arm and blade may be treated as a substantially integral unit, allowing for what relative movement between the arm and blade as may be desired, and the angularly disposed pivot means or connection placed intermediately the ends of the assembly and especially between the extremities of the arm. The outer portion of the assembly thus pivots relative to the inner portion of the assembly and its support in the manner of the blade of the first described form of the invention and thereby similarly conforms to a curved windshield.

It is, therefore, an important object of the present invention to provide an improved, simplified windshield wiper arm and blade assembly, which can be produced economically, for the wiping of a vehicular windshield of irregular curvature.

Another important object is the provision of an improved wiper arm blade assembly wherein the arm and blade are relatively movable about a single axis which is disposed at an acute angle to the longitudinal axis of the arm and the blade.

It is a further important object to provide an improved windshield wiper arm and blade assembly wherein the conforming movement of the blade to a variently curved windshield necessarily affects tilting movement of the blade relative to the arm, the blade and arm being interconnected for movement about a single inclined axis.

A further object is to provide an improved windshield wiper assembly wherein the conforming movement thereof relative to a variently curved windshield takes place about a single inclined axis intermediate the ends of the assembly and particularly between the ends of an arm of the assembly.

Yet another object is to provide a method of wiping a windshield wherein an arm and a blade traverse the windshield, with relative movement therebetween being confined to an axis inclined at an acute angle to the longitudinal axis of the arm and the blade to cause concurrent conforming movement of the blade to the glass and tilting movement of the blade relative to the arm.

It is still another object of the present invention to provide a method of wiping a windshield wherein an arm and a blade interconnected about an axis inclined acutely with respect to the longitudinal arm and blade axis are reciprocated across a variently curved windshield, conforming movement of the blade to the glass about said axis causing concurrent and proportional tilting movement of the blade with respect to the arm.

A still further object is to provide a method of wiping a windshield by an assembly including an arm and wiping element wherein the assembly is moved across a windshield and pivoted about an axis disposed between the ends of the assembly and inclined at an acute angle to the general longitudinal axis of the assembly.

Other objects of the invention are apparent from the following description and the accompanying drawings wherein:

FIGURE 1 is a perspective, somewhat schematic view of a windshield of the "wrap-around" type illustrating a windshield wiper arm and blade of the present invention in three adjusted positions within the wiping pattern;

FIGURE 2 is a fragmentary, enlarged plan view of the arm and blade connection;

FIGURE 3 is a fragmentary sectional view taken along the plane 3—3 of FIGURE 1;

FIGURE 4 is a sectional view taken along the plane 4—4 of FIGURE 3;

FIGURE 5 is a fragmentary sectional view similar to FIGURE 3 taken along the plane 5—5 of FIGURE 1;

FIGURE 6 is a sectional view taken along the plane 6—6 of FIGURE 5;

FIGURE 7 is a plan view of an arm of an assembly of modified structure and illustrates how the angularly disposed pivot means may be placed elsewhere than between the arm and blade;

FIGURE 8 is a longitudinal section of FIGURE 7 on the line 8—8; and

FIGURE 9 is a perspective exploded view of the parts of FIGURE 8.

In FIGURE 1, reference numeral 10 refers generally to a windshield of the "wrap-around" type, only one-half, i.e. the driver's half, of the windshield being shown for clarity of illustration. The surface contour of the windshield exterior surface 10a, which constitutes the surface to be wiped, is determined by the shape and contour of the surrounding sheet metal portions of the vehicular body. The contour of the upper edge 11 of the windshield is determined by the contour of the header portion of the vehicular roof panel, the cowl shape of the vehicle determines the contour of the lower edge 12 of the windshield, and the lateral extremity 13 of the windshield is determined by the slope and contour of the upright, front corner post of the vehicle. It will be appreciated from an inspection of FIGURE 1 of the drawings that the windshield 10 is of appreciable lateral curvature, and that the vertical inclination thereof varies across the lateral extent of the windshield.

While there is shown and described herewith a particular configuration of windshield, it will be understood that the subject invention is readily adaptable to the efficient wiping of a practically limitless number of windshields of varying configuration, each differing from the illustrated example and from each other.

As shown in FIGURE 1, the windshield wiper system for utilization with the windshield 10 includes an actuating or pivot shaft (not shown) upon which is disposed one end of a windshield wiper actuating arm indicated generally at 15. The arm 15 is provided at its lower end with a socket end 16, as is well-known in the art, receiving the pivot shaft and disposing the arm for oscillatory movement between the various positions of the arm as indicated in FIGURE 1. The arm 15 at its opposite end has an arm extension 17 generally overlying the surface of the windshield 10 and carrying means indicated generally at 18 for connecting the arm to a wiper blade 20. The connection means 18 includes a bracket 21 formed by stamping or the like and including a top wall 22 overlying the outer end of the arm and having depending flanges 23 lying along each lateral extremity of the arm extension 17. The connector 18 is secured to arm extension 17 by a suitable means, as by a rivet 24.

The outer end of the bracket 17 is provided with a pair of laterally spaced, elongated, depending flanges or ears 25 which terminate in lower edges 26. The ears or legs 25 are apertured as at 27 (FIGURES 4 and 6) to receive therethrough a pivot pin, rivet, or similar pivot member 30.

The blade 20 is preferably of the type illustrated in Patent No. 2,596,063 to John W. Anderson, the blade including a central bridge member 31 and secondary bridge members 32 (FIGURE 1) which are interconnected, the secondary bridge members being connected to the resilient wiper element 33 through a resiliently flexible support element 34.

The central or primary bridge 31 is provided with an upstanding projection indicated generally at 35 and best illustrated in FIGURES 4 and 6. The projection 35 is fixed to the central bridge 31 by suitable means, as by staking, riveting, or the like.

The upstanding projection 35 includes a lower arcuate surface 36 contoured to snugly abut the upper arcuate surface of the bridge 31, a base portion 37 providing the lower arcuate surface 36, and an upstanding portion 38 adapted to be received by and projecting between the legs 25 of the connector bracket 21. The projecting portion 38 is provided with tapered side walls which present generally concave side surfaces formed by planar surfaces 38a, 38b, 38c and 38d. The surfaces 38a and 38c are parallel, and the surfaces 38b and 38d are parallel to provide stop surfaces, as will be later described in detail. The projection terminates in an upper or top wall 39 which is spaced vertically a substantial distance beneath the adjacent inner surface of the bracket 21.

It will be noted from FIGURES 2, 3 and 5 that the pin 30 is angularly disposed with respect to the arm and the blade. More specifically, the pin 30 lies at an acute angle with respect to the medial vertical longitudinal axis of the arm, neglecting the usual parking offset of the arm, and to the longitudinal plane of the blade. This acute angle is illustrated at a in FIGURE 2, with the reference character b indicating the complementary angle which, of course, is obtuse. As used here and in the claims, the term "acute angle" is utilized to distinguish between the present invention and certain prior art connectors in which the connection between the arm and the blade includes a connecting pivot lying normal to or at right angles to the longitudinal planes of the arm and the blade, or which lie in or parallel to these longitudinal planes. The axis of the angularly disposed pivot means may also be considered as contained in a plane extending substantially perpendicular to the axis of the pivot shaft, also in distinction from such prior art connectors.

The angularly disposed pivot means need not be stationed directly between the arm and blade to realize the advantages of the present invention. Instead, the assembly constituting the arm and blade or other wiping element may be considered as a substantially integral wiping unit, and the described pivot means incorporated into the structure at any desired point intermediate the ends of the assembly and particularly between the ends of the arm. In this manner, one portion of the assembly, extending from the pivot means to an inner end of the assembly and adjacent a support or actuating means, preferably has a fixed position with respect to the support, while another portion of the assembly extending from the pivot means away from the support, executes a pivot or tilt or turn about the described pivot means.

FIGURES 7, 8, and 9 illustrate one embodiment of this form of the invention wherein the angularly disposed pivot means is stationed by an inner end of the wiping assembly and adjacent an actuating pivot shaft. More particularly, this embodiment includes an arm generally shown at 40 joined to a support generally indicated at 41 by an angularly disposed pivot pin 42. The arm 40 comprises an arm extension or bar 43 and a channel 44 diagonally tapered at an inner end. A second channel 45 has a rounded end 45a and a diagonally tapered end opposite end 45b which straddles the inner end of channel 44. Both channels have suitably aligned openings to receive the angularly disposed pivot pin 42. A rivet 43a secures the bar 43 to the channel 44. A wiper blade 46 which may be similar to the blade 20 is attached to the outer end of the bar 43. Although in this form of the invention the arm and blade may be considered as a substantially integral wiping unit, some relative movement may be desired between the arm and blade. To this end a connector 47 may be used to join the blade 46 to the arm 40 as by a pivot pin 48. Any of the connectors well known in the art may be employed for this purpose, and therefore the connector 47 is not described in detail.

The support 41 includes a ring member 49 and bearing means 50. The ring member is internally splined as at 51 to mate with the outer splines 52 of a drum driver 53 fixed to an actuating shaft 54. Conventional means oscillate the shaft 54 about a longitudinal axis to move the wiper assembly back and forth across a windshield surface. The channel 45 and ring member 49 are mutually deformed or staked as at 55 to maintain the channel 45 in a substantially fixed position relative to the support 41. A pair of parallel wings 56 project from the ring member 49 and receive therebetween an extension 50a of the bearing means 50. The sides of the extension are spaced inwardly from the sides of the bearing means to define shoulders 57. A pin 58 connects the extension 50a to the wings 56 and may, if desired, permit slight pivotal movement between the extension 50a and the wings 56. The outer ends of the wings limit such movement by striking the shoulders 57. The bearing means is bifurcated to form forks 50b and 50c, the latter fork being of shorter length than the other fork for a purpose hereinafter noted. A pin 59 is fixed in openings 60 of the forks. A spring 61 has one end hooked about the pin 59 and the other end engaging an opening 62 in a bent end 43b of the bar to urge the arm in a clockwise direction as viewed in FIGURE 8.

The operation of the wiper assembly of the present invention relies upon the fact that the inclined pivot pin 30 in the form of the invention first described is utilized to accommodate that movement between the arm and blade which is necessary for the blade wiping edge to longitudinally conform to the windshield. As the arm and blade are oscillated across the surface of the windshield 10, the realtive vertical inclination of the windshield with respect to the arm changes, and the blade necessarily conforms to the windshield surface because of arm pressure so that the longitudinal wiping edge of the blade remains in constant and full length contact with the windshield. Thus, there is a varying angular relationship between the arm and the blade as these elements traverse the windshield surface.

Because of the angularity of the pivot shaft 30, this conforming movement occurs about an axis which is inclined or angularly disposed with respect to a longitudinal axis of the arm and the blade, and this angularity of the sole axis of relative arm-to-blade movement causes the blade to tilt relative to the arm, as best seen in FIGURES 5 and 6. The tilting movement may, if desired, be limited by abutment of the surfaces 38a and 38c, and 38b and 38d, with the inner surfaces of the legs 25. If the pin 30 lay normal to the longitudinal axes of the arm and the blade, there would be not tilting movement, and if the pin 30 were parallel to the longitudinal axes of the arm and the blade, there could be no movement by which the blade could, with certainty, conform to the windshield.

The action of the embodiment of FIGURES 7, 8, and 9 is similar to that just described. In this case, the blade 46 and the portion of the arm 40 up to and including the channel section 44 pivot bodily or substantially in unison about the pivot pin 42. The spring 61 aids in obtaining this pivoting action. In addition, there may if desired be some relative movement between the blade 46 and arm 40. During the pivoting about pin 42, the portion of the assembly to the left of the pivot pin 42, namely channel 45 in the embodiment shown, does not move relative to the support 41. It may be unnecessary to limit the pivoting of the blade 46 and arm 40 about the pin 42, but where necessary or desired the forks strike the underside of the web 44a of the channel section 44 or the flanges or sides 44b thereof to provide this control. To this end, the lengths of the forks 50b and 50c, their relative lengths inter se, and the like may be varied to meet diverse requirements. For example, in the embodiment disclosed, the shorter length of fork 50c enables fork 50b to strike the underside and/or sides of the channel section 44 and thereby limit the pivoting of the blade 46, bar 43, and channel section 44 about the pivot pin 42 without interference from the fork 50c. This use of only one fork to limit the pivoting may also provide a greater angle through which the indicated parts turn. The edges of the forks may also be rounded, as shown at 50d, chamfered as indicated by the dotted line 50e or otherwise treated to provide a control on the pivoting which is effective at a desired time.

Thus, the present invention provides an improved arm and blade assembly wherein the arm and blade are interconnected in one form of the invention for tilting movement about a single axis defined by the pivot pin 30 which lies at an acute angle to longitudinal axes of the arm 15 and the blade 20; or wherein the blade 46 and arm 40 may pivot en masse in another form of the invention about a pin 42 which lies similarly at an acute angle to the longitudinal axis of the arm 40. This angular relationship of the pins 30 and 42 causes, respectively, concurrent and proportional conforming and tilting movement of the blade 20 relative to the arm 15; or such movement of the blade 46 and part of the arm 40 to the remaining part of the arm 40. The tilting movement of the blade which occurs as a consequence of this blade conforming movement causes the blade to remain substantially erect or in the proper wiping attitude or posture to the curved glass surface.

It will, of course, be understood that various details of construction may be varied through a wide range without departing from the principles of this invention, and it is, therefore, not the purpose to limit the patent granted herein otherwise than necessitated by the scope of the appended claims.

I claim:

1. In a windshield wiper assembly for a curved windshield including an actuator shaft adapted to oscillate about a longitudinal axis, an arm support comprising a ring member secured about the shaft and having fork elements extending from the ring member, an arm having one end provided with a wiping blade and the other end straddling the fork elements, and a pivot pin mutually journalled in said straddling end of the arm and fork elements and defining an acute angle with a longitudinal axis of the arm to permit that portion of the assembly extending outwardly from the pivot pin to turn thereabout and thereby accommodate conforming movements of said outwardly extending portion of the assembly relative to the curved windshield, wherein the end of the arm straddling the fork elements is channel-shaped and the fork elements limit the turning of the outwardly extending portion of the assembly about the pivot pin by striking the web and sides of said channel-shaped end.

2. The claimed subject matter of claim 1 wherein one fork element is longer that the other to so limit the turning of the outwardly extending portion of the assembly preferentially to the other fork.

References Cited

UNITED STATES PATENTS 2,691,186  10/1954  Oishei et al. _____ 15—253

CHARLES A. WILLMUTH, *Primary Examiner.*